US010852543B2

(12) United States Patent
Matsuki et al.

(10) Patent No.: US 10,852,543 B2
(45) Date of Patent: Dec. 1, 2020

(54) LIGHT GUIDE DEVICE AND DISPLAY DEVICE

(71) Applicant: SEIKO EPSON CORPORATION, Tokyo (JP)

(72) Inventors: Hayato Matsuki, Suwa (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 118 days.

(21) Appl. No.: 15/923,674

(22) Filed: Mar. 16, 2018

(65) Prior Publication Data

US 2018/0284448 A1 Oct. 4, 2018

(30) Foreign Application Priority Data

Mar. 28, 2017 (JP) .................................. 2017-062399
Dec. 27, 2017 (JP) .................................. 2017-250698

(51) Int. Cl.
*G02B 27/01* (2006.01)
*G02B 6/00* (2006.01)
*F21V 8/00* (2006.01)

(52) U.S. Cl.
CPC ....... *G02B 27/0172* (2013.01); *G02B 6/0055* (2013.01); *G02B 6/003* (2013.01); *G02B 2027/0118* (2013.01); *G02B 2027/0178* (2013.01)

(58) Field of Classification Search
CPC .............. G02B 27/0172; G02B 6/0055; G02B 2027/0118; G02B 6/003; G02B 2027/0178; G02B 6/00
See application file for complete search history.

(56) References Cited

U.S. PATENT DOCUMENTS

| 6,422,713 B1 * | 7/2002 | Fohl | G02B 27/09 362/339 |
|---|---|---|---|
| 9,248,616 B2 | 2/2016 | Amitai | |
| 2003/0165017 A1 | 9/2003 | Amitai | |
| 2016/0282622 A1 | 9/2016 | Hiraide | |

(Continued)

FOREIGN PATENT DOCUMENTS

| JP | 5698297 B2 | 4/2015 |
|---|---|---|
| JP | 2016-042136 A | 3/2016 |

(Continued)

*Primary Examiner* — Michelle M Iacoletti
*Assistant Examiner* — Danell L Owens
(74) *Attorney, Agent, or Firm* — Oliff PLC

(57) ABSTRACT

Light guide system includes transparent light guide section that leads light inputted through one end portion, to an output section. The light guide section includes a plurality of partial reflection planes, each inclined at a same angle such that a first end portion is located on the side of the one end portion, with respect to a second end portion, and aligned between a first plane and a second plane parallel to each other. Pitches among the partial reflection planes in a first direction are widened toward another end portion, from the side of the one end portion. From an eye of a viewer, a wide overlapping portion is non-existent between two partial reflection planes adjacent to each other on the side of the another end portion, and a wide gap is non-existent between two partial reflection planes adjacent to each other on the side of the one end portion.

19 Claims, 13 Drawing Sheets

(56) References Cited

U.S. PATENT DOCUMENTS

| | | | |
|---|---|---|---|
| 2017/0045744 A1* | 2/2017 | Amitai | G02B 27/30 |
| 2017/0219830 A1* | 8/2017 | Komatsu | G02B 17/086 |

FOREIGN PATENT DOCUMENTS

| | | |
|---|---|---|
| JP | 2016-177231 A | 10/2016 |
| JP | 2017-003845 A | 1/2017 |
| WO | 01/95027 A2 | 12/2001 |
| WO | 2016/027442 A1 | 2/2016 |

* cited by examiner

FIG. 3

| | PLANE NUMBER | | (3) | (4) | (5) | (6) | (7) | (8) |
|---|---|---|---|---|---|---|---|---|
| RADIUS OF CURVATURE | 1/C | | 47.32704 | 20.43138 | -94.4124 | -18.27486461 | -32.55955172 | -20.5164 |
| NORMALIZED RADIUS | R0 | | 10 | 10 | 10 | 1 | 1 | 10 |
| KORENICH CONSTANT | k | | 0 | 0 | 0 | 0 | 0 | 0 |
| ASPHERICAL CONSTANT An,m | n | m | | | | | | |
| | 1 | 0 | 0 | 0 | 0 | 0 | 0 | 0 |
| | 0 | 1 | 0 | 0 | 0 | 0 | 0 | 0 |
| | 2 | 0 | 0.30111 | -0.65248 | 7.481127 | 0 | 0 | 22.199 |
| | 1 | 1 | 0 | 0 | 0 | 0 | 0 | 0 |
| | 0 | 2 | -1.49649 | -2.19068 | -0.97359 | 0 | 0 | -2.20855 |
| | 3 | 0 | 0 | 0 | 0 | 0 | 0 | 0 |
| | 2 | 1 | -0.38934 | -0.48843 | 4.307729 | 0 | 0 | 0.825022 |
| | 1 | 2 | 0 | 0 | 0 | 0 | 0 | 0 |
| | 0 | 3 | -0.17699 | -0.20942 | -1.57325 | 0 | 0 | -0.6926 |
| | 4 | 0 | 1.190703 | 0.462939 | 0.057625 | 0.000448014 | 0.000395598 | 115.6255 |
| | 3 | 1 | 0 | 0 | 0 | 0 | 0 | 0 |
| | 2 | 2 | 0.36527 | -0.18742 | 0.522778 | 0.000896029 | 0.000791197 | -30.5015 |
| | 1 | 3 | 0 | 0 | 0 | 0 | 0 | 0 |
| | 0 | 4 | -0.10208 | -0.05259 | 0.783201 | 0.000448014 | 0.000395598 | 0.171161 |
| | 5 | 0 | 0 | 0 | 0 | 0 | 0 | 0 |
| | 4 | 1 | -0.75152 | 0.310014 | 5.331907 | 0 | 0 | 69.49481 |
| | 3 | 2 | 0 | 0 | 0 | 0 | 0 | 0 |
| | 2 | 3 | 0.067009 | -0.5254 | 0.2932 | 0 | 0 | -2.61446 |
| | 1 | 4 | 0 | 0 | 0 | 0 | 0 | 0 |
| | 0 | 5 | -0.08797 | -0.26988 | 0.207203 | 0 | 0 | -0.27466 |
| | 6 | 0 | 2.007158 | 0.033345 | -1.17421 | -2.97E-06 | -8.19E-07 | 1182.16 |
| | 5 | 1 | 0 | 0 | 0 | 0 | 0 | 0 |
| | 4 | 2 | 0.637684 | -0.03644 | 12.61574 | -8.90E-06 | -2.46E-06 | -409.229 |
| | 3 | 3 | 0 | 0 | 0 | 0 | 0 | 0 |
| | 2 | 4 | 0.034959 | 0.704564 | -11.3076 | -8.90E-06 | -2.46E-06 | 6.221191 |
| | 1 | 5 | 0 | 0 | 0 | 0 | 0 | 0 |
| | 0 | 6 | 0.070356 | -0.1718 | -5.68874 | -2.97E-06 | -8.19E-07 | -0.66636 |

$$Z = \frac{c \cdot (x^2 + y^2)}{1 + \sqrt{1 - (1+K)c^2 \cdot (x^2 + y^2)}} + \sum\sum (Cj(m,n) \times x^m \times y^n)$$
$$j = [(m+n)^2 + m + 3n]/2 + 1$$
(EQUATION 1)

| PLANE NUMBER | PLANE PITCH | REFRACTIVE INDEX (nd) | ABBE CONSTANT (v) |
|---|---|---|---|
| (3) | 7.7 | 1.531 | 56 |
| (4) | 4.9 | 1.531 | 56 |
| (3) | 2.5 | | |
| (5) | 6 | 1.531 | 56 |
| (6) | 1.2 | | |
| (7) | 2.3 | 1.585 | 30 |
| (8) | 2.1 | | |

LIGHT GUIDE DEVICE AND DISPLAY DEVICE

BACKGROUND

1. Technical Field

The present disclosure relates to a light guide device and a display device.

2. Related Art

For example, JP-A-2016-177231 discloses a light guide device for use in a display device or the like, having a light guide section including a plurality of half mirrors, obliquely oriented and aligned parallel to each other at an equal pitch, and located between two planes (first plane and second plane) extending from one end portion for receiving an image light, toward another end portion. In such a light guide device, the image light is reflected between the first plane and the second plane so as to proceed inside the light guide section from one end portion toward another end portion, and outputted toward the eye of a viewer through the half mirror. Therefore, the viewer can recognize a virtual image, and also light from outside can reach the eye of the viewer, through the light guide section.

In addition, a light guide device that includes, in an output section, a plurality of half mirrors obliquely oriented and aligned parallel to each other between two planes (first plane and second plane), has been proposed (see, for example, JP-A-2017-3845). The paragraph [0046] of JP-A-2017-3845 proposes arranging the half mirrors at variable pitches in the output section, and also arranging the half mirrors in a predetermined pitch pattern, including pitches that are widened and narrowed in a plurality of steps.

Referring to FIG. 13, in the light guide device according to JP-A-2016-177231, a gap 559 is present, when viewed from an eye E of the viewer, between two partial reflection planes 55 (half mirrors) adjacent to each other in a first direction X, on the side of end portion 51 of a light guide section 50 into which an image light L is inputted, and therefore a portion where the image light L is absent is recognized as a line. In contrast, on the side of another end portion 52 of the light guide section 50, an overlapping portion 558, where the partial reflection planes 55 overlap, is present in the two partial reflection planes 55 adjacent to each other in the first direction X, when viewed from the eye E of the viewer, and therefore a line of high luminance is recognized. Although JP-A-2017-3845 proposes arranging the half mirrors at variable pitches, such a configuration is unable to prevent appearance of the line in the image.

SUMMARY

An advantage of some aspects of the embodiment is provision of a light guide device and a display device, configured to prevent degradation in image quality originating from an overlapping portion or a gap, between partial reflection planes located adjacent to each other, in a plurality of partial reflection planes arranged in a light guide section parallel to each other.

In an aspect, the embodiment provides a light guide device including a transparent light guide section that leads light inputted through one end portion to an output section. The light guide section includes a first plane extending from the one end portion through which the light is inputted, toward another end portion in a first direction, a second plane located on one side of the first plane in a second direction intersecting the first direction, and extending parallel to the first plane in the first direction, and a plurality of partial reflection planes aligned in the first direction between the first plane and the second plane, and inclined at a same angle toward the one end portion, with respect to a normal direction of the second plane. Pitches among the plurality of partial reflection planes in the first direction are widened, in a direction toward a side of the another end portion, from a side of the one end portion.

In the light guide device configure as above, the pitches in the first direction between the plurality of partial reflection planes aligned parallel to each other in the light guide section are widened toward the side of the another end portion, from the side of one end portion. Accordingly, when the light guide section is located in front of the eye of a viewer, a gap is narrow or non-existent, when viewed from the eye, between two partial reflection planes on the side of the one end portion of the light guide section, through which image light is inputted. Therefore, appearance of a line-shaped portion where the image light is absent can be suppressed. In addition, on the side of the another end portion of the light guide section, an overlapping portion where the partial reflection planes overlap is narrow or non-existent, between two partial reflection planes adjacent to each other. Therefore, appearance of a line having high luminance in the image can be suppressed. Such configurations prevent degradation in image quality, originating from the overlapping portion or the gap between the partial reflection planes adjacent to each other, to thereby allow the viewer to recognize an image of high quality.

BRIEF DESCRIPTION OF THE DRAWINGS

The embodiment will be described with reference to the accompanying drawings, wherein like numbers reference like elements.

FIG. 3 includes tables and an equation for explaining a design example of a projection lens system and an input section shown in FIG. 2.

DESCRIPTION OF EXEMPLARY EMBODIMENTS

Figure 1:
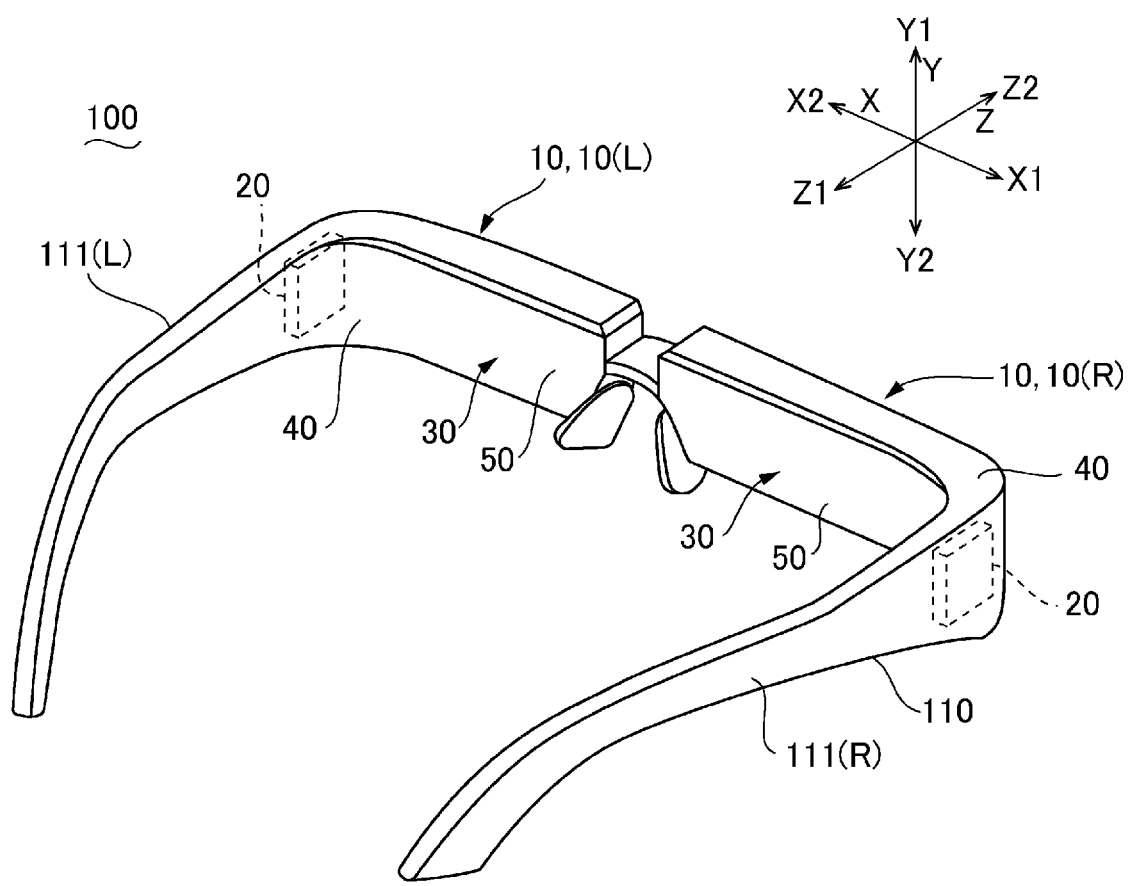
FIG. 1 is a schematic perspective view showing an example of appearance of a display device according to a first embodiment.

Hereafter, embodiments of the disclosure will be described. In the drawings to be referred to hereunder, the number of layers or components, and the reduction scale thereof, may differ from the actual ones, for the sake of better visual recognition.

First Embodiment

General Configuration

FIG. 1 is a schematic perspective view showing an example of appearance of a display device 100 according to a first embodiment. The display device 100 shown in FIG. 1 is configured as a see-through eyeglass display, and includes a frame 110 having a temples 111(R) and 111(L) on the respective sides. In the display device 100, a display section 10 to be subsequently described is supported by the frame 110, and light outputted from the display section 10 is recognized by a viewer, as a virtual image. In this embodiment, the display section 10 of the display device 100 includes a display section 10(R) for the right eye and a display section 10(L) for the left eye. The display section 10(R) for the right eye and the display section 10(L) for the left eye are configured in the same way and arranged in a left-right symmetry. Accordingly, the following description will be primarily focused on the display section 10(R) for the right eye, and the description of the display section 10(L) for the left eye will be omitted, where appropriate. In the following description, a left-right direction will be defined as a first direction X, a front-back direction will be defined as a second direction Z, and an up-down direction will be defined as a third direction Y. In addition, one side (right side) in the first direction X will be denoted by X1, the other side (left side) in the first direction X will be denoted by X2, one side (rear side) in the second direction Z will be denoted by Z1, the other side (front side) in the second direction Z will be denoted by Z2, one side (upper side) in the third direction Y will be denoted by Y1, and the other side (lower side) in the third direction Y will be denoted by Y2. Since the display section 10(R) for the right eye and the display section 10(L) for the left eye are symmetrically arranged, the one side X1 and the other side X2 in the first direction X are inverted, between the display section 10(R) and the display section 10(L).

General Configuration of Display Section 10

Figure 2:
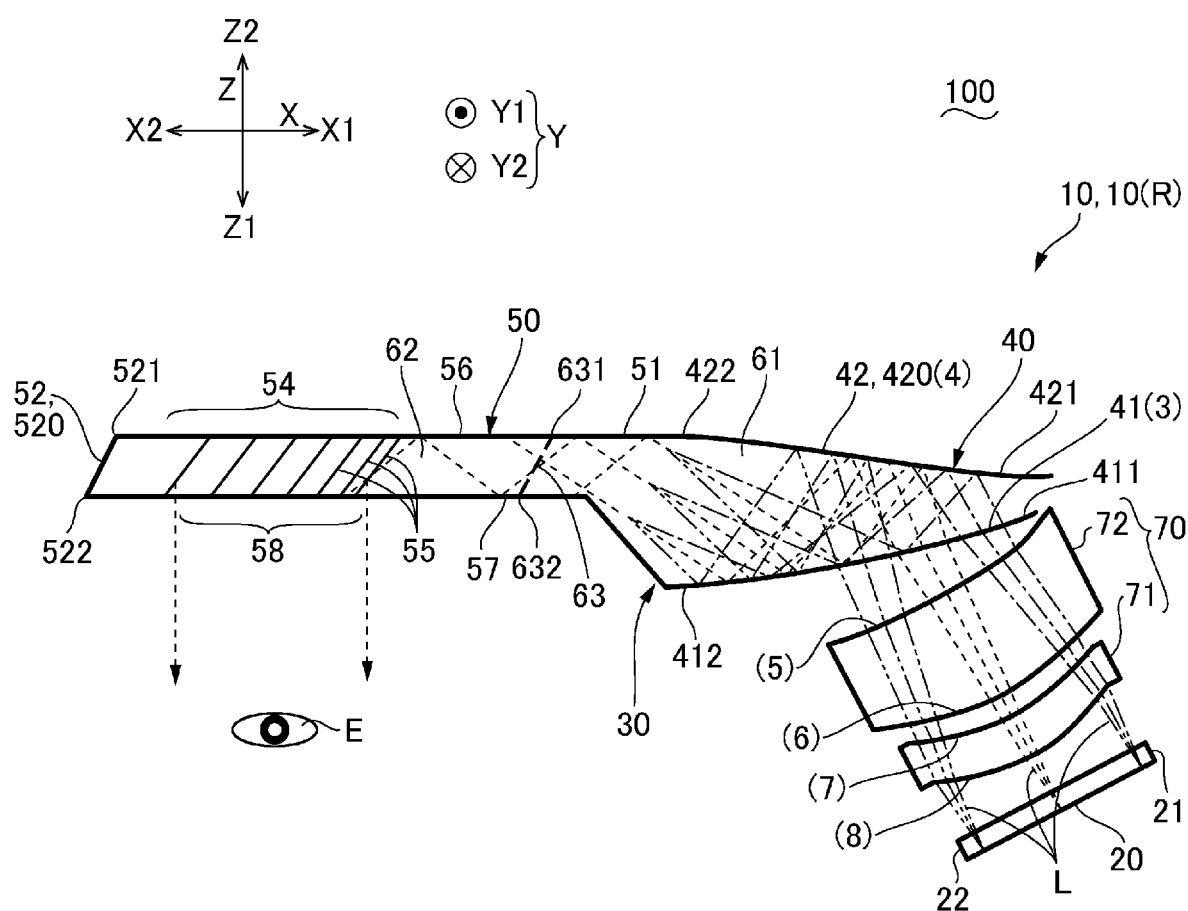
FIG. 2 is a plan view of an optical system of the display device shown in FIG. 1.

FIG. 2 is a plan view of an optical system of the display device 10 shown in FIG. 1. In FIG. 2, the image light L outputted from the center of an image generation system 20 is indicated by dotted lines, and the image light L outputted from the end portions of the image generation system 20 is indicated by dash-dot lines and dash-dot-dot lines, respectively. As shown in FIG. 2, the display section 10 (display section 10(R)) includes the image generation system 20 that outputs the image light L, which is non-parallel light, and a light guide system 30 that leads the inputted image light L to an output section 58, and the light guide system 30 exemplifies the light guide device in the embodiment. In this embodiment, a projection lens system 70 is provided between the image generation system 20 and the light guide system 30 (light guide device), so that image the image light L outputted from the generation system 20 is inputted into the light guide system 30, through the projection lens system 70. The projection lens system 70 includes two lenses, namely a first lens 71, and a second lens 72 located between the first lens 71 and the light guide system 30.

The light guide system 30 includes a transparent input section 40, having a curved input surface 41 through which the image light L is inputted and a curved reflecting surface 42 that reflects the image light L inputted through the curved input surface 41, between the curved reflecting surface 42 and the curved input surface 41, thereby converting the image light L into parallel light, and a transparent light guide section 50 having an end portion 51 in the first direction X connected to the input section 40, the light guide section 50 serving to lead the parallel light inputted from the input section 40, to the output section 58. The light guide section 50 includes a first plane 56 (first reflection plane) extending from the end portion 51 (on the X1 side) toward the other end portion 52 in the first direction X (on the X2 side), a second plane 57 (second reflection plane) located on the Z1 side in the second direction Z intersecting the first direction X, and extending in the first direction X parallel to the first plane 56, and the output section 58 provided on the second plane 57 at a position spaced from the input section 40. In the light guide system 30 configured as above, the parallel light outputted from the input section 40 and received by the light guide section 50 is reflected between the first plane 56 and the second plane 57 so as to be led from the X1 side toward the X2 side in the first direction X, in other words to the output section 58, and outputted from the output section 58.

Detailed Configuration of Image Generation System 20

The image generation system 20 is an optical modulation panel constituted of a liquid crystal device, an organic electroluminescence device, or the like, and located on the X1 side in the first direction X with respect to the opposed to the input section 40, so as to oppose the curved input surface 41 on the Z1 side in the second direction Z. In this embodiment, the image generation system 20 is obliquely oriented, such that an end portion 21 on the X1 side in the first direction X is located on the Z2 side in the second direction Z, with respect to the other end portion 22 on the X2 side in the first direction X.

Detailed Configuration of Input Section 40

In the input section 40, the curved input surface 41 is oriented to the Z1 side in the second direction Z, and opposed to the image generation system 20 across the projection lens system 70. Accordingly, the curved input surface 41 is obliquely located such that an end portion 411 on the Z2 side in the second direction Z is located on the X1 side in the first direction X, with respect to the other end portion 412 on the Z1 side in the second direction Z. However, a pitch between the end portion 412 of the curved input surface 41 and the end portion 22 of the image generation system 20 is wider than a pitch between the end portion 411 of the curved input surface 41 and the end portion 21 of the image generation system 20. The curved input surface 41 may be constituted of a curved surface such as an aspherical surface or a free-form surface and, in this embodiment, the curved input surface 41 is formed as a convex free-form surface. Although a reflecting film is not provided, the curved input surface 41 totally reflects light incident thereon at an incident angle equal to or larger than a critical angle. Thus, the curved input surface 41 is both transmissive and reflective.

The curved reflecting surface 42 is constituted of a surface oriented to the Z2 side in the second direction Z, and obliquely located an end portion 421 on the X1 side in the first direction X is located on the Z1 side in the second direction Z, with respect to the other end portion 422 on the X2 side in the first direction X. The curved reflecting surface 42 may be constituted of a curved surface such as an aspherical surface or a free-form surface and, in this embodiment, the curved reflecting surface 42 is formed as a convex free-form surface. The curved reflecting surface 42 may be configured, though without a reflecting film, so as to totally reflect light incident thereon at an incident angle equal to or larger than a critical angle. In this embodiment, however, the curved reflecting surface 42 is provided with a reflective metal layer 420, predominantly composed of aluminum, silver, magnesium, or chrome. Therefore, the curved reflecting surface 42 can surely reflect light, even when the incident angle is small.

In the input section 40 configured as above, when the image light L, which is non-parallel light, is inputted to the curved input surface 41, the image light L is refracted by the curved input surface 41, and proceeds toward the curved reflecting surface 42. Then the image light L is reflected by the curved reflecting surface 42, and again proceeds toward the curved input surface 41. At this point, the image light L is inputted to the curved input surface 41 at an incident angle equal to or larger than the critical angle, and therefore the image light L is reflected by the curved input surface 41 toward the light guide section 50, during which the image light L is converted into parallel light. Thus, the image light L is turned into the parallel light by both of the curved reflecting surface 42 and the curved input surface 41, and therefore the design requirements for the projection lens system 70 can be alleviated. Accordingly, the configuration of the projection lens system 70 can be simplified such that, for example, only a pair of lenses (first lens 71 and second lens 72) are employed. In addition, simplifying the configuration of the projection lens system 70 leads to reduction in size and weight of the display device 100 (display section 10).

Design Example of Projection Lens System 70 and Input Section 40

FIG. 3 includes tables and an equation for explaining a design example of the projection lens system 70 and the input section 40 shown in FIG. 2. The first lens 71, the second lens 72, the curved input surface 41, and the curved reflecting surface 42 are formed as specified in FIG. 3. In the upper section in FIG. 3, coefficients in a free-form surface function, expressed as Equation 1 in FIG. 3, are indicated. In the lower section in FIG. 3, a refractive index (nd) and an Abbe constant (v) of the materials constituting the first lens 71, the second lens 72, and the input section 40 are indicated. Out of plane numbers (3) to (8) shown in FIG. 3, the plane number (3) corresponds to the curved input surface 41, and the plane number (4) corresponds to the curved reflecting surface 42. The plane number (5) corresponds to the surface of the second lens 72 on the output side, and the plane number (6) corresponds to the surface of the second lens 72 on the input side. The plane number (7) corresponds to the surface of the second lens 71 on the output side, and the plane number (8) corresponds to the surface of the second lens 71 on the input side.

Detailed Configuration of Light Guide Section 50

Referring again to FIG. 2, the light guide section 50, in which the first plane 56 and the second plane 57 are arranged parallel to each other, includes a third plane 520 between the first plane 56 and the second plane 57, on the side of the other end portion 52. The distance from the first plane 56 to the second plane 57 in the second direction Z, in other words the thickness of the light guide section 50 in the second direction Z, is thinner than the thickness of the input section 40 in the second direction Z. The first plane 56 and the second plane 57 totally reflect the light incident thereon at an incident angle equal to or larger than the critical angle, according to a difference in refractive index between the light guide section 50 and outside (air). For such reason, the first plane 56 and the second plane 57 are without a reflecting film.

The light guide section 50 includes, in a portion spaced from the input section 40, a plurality of partial reflection planes 55, each inclined toward the X1 side in the first direction X with respect to the normal of the second plane 57 when viewed in the third direction Y, and aligned in the first direction X parallel to each other. The output section 58 corresponds to the portion of the second plane 57 overlapping the plurality of partial reflection planes 55 in the second direction Z, and has a predetermined width in the first direction X.

The partial reflection planes 55 are each constituted of a dielectric multilayer film. Here, at least one of the partial reflection planes 55 may have a composite structure including the dielectric multilayer film and a reflective metal layer (thin film) predominantly composed of aluminum, silver, magnesium, or chrome. In the case where the partial reflection plane 55 includes the metal layer, the reflectance of the partial reflection plane 55 can be improved, and also the incident angle dependence and polarization dependence of the transmittance and the reflectance of the partial reflection plane 55 can be optimized.

In the light guide section 50 configured as above, the image light L, which is the parallel light, inputted from the input section 40 is reflected between the first plane 56 and the second plane 57, so as to proceed from the X1 side toward the X2 side in the first direction X. A part of the image light L inputted to the partial reflection plane 55 is reflected by the partial reflection plane 55 and outputted toward an eye E of the viewer, through the output section 58. The remaining portion of the image light L inputted to the partial reflection plane 55 is transmitted therethrough, and inputted to the adjacent partial reflection plane 55, on the X2 side in the first direction X. Accordingly, in each of the partial reflection planes 55, the image light L reflected to the Z1 side in the second direction Z is outputted toward the eye E of the viewer, through the output section 58. Therefore, the viewer can recognize a virtual image. At the same time, light inputted to the light guide section 50 from outside is transmitted through the partial reflection plane 55 and reaches the eye E of the viewer. Accordingly, the viewer can recognize both the image generated by the image generation system 20, and the see-through view of the surrounding scene.

Structure inside of Light Guide Section 50

Figure 4:
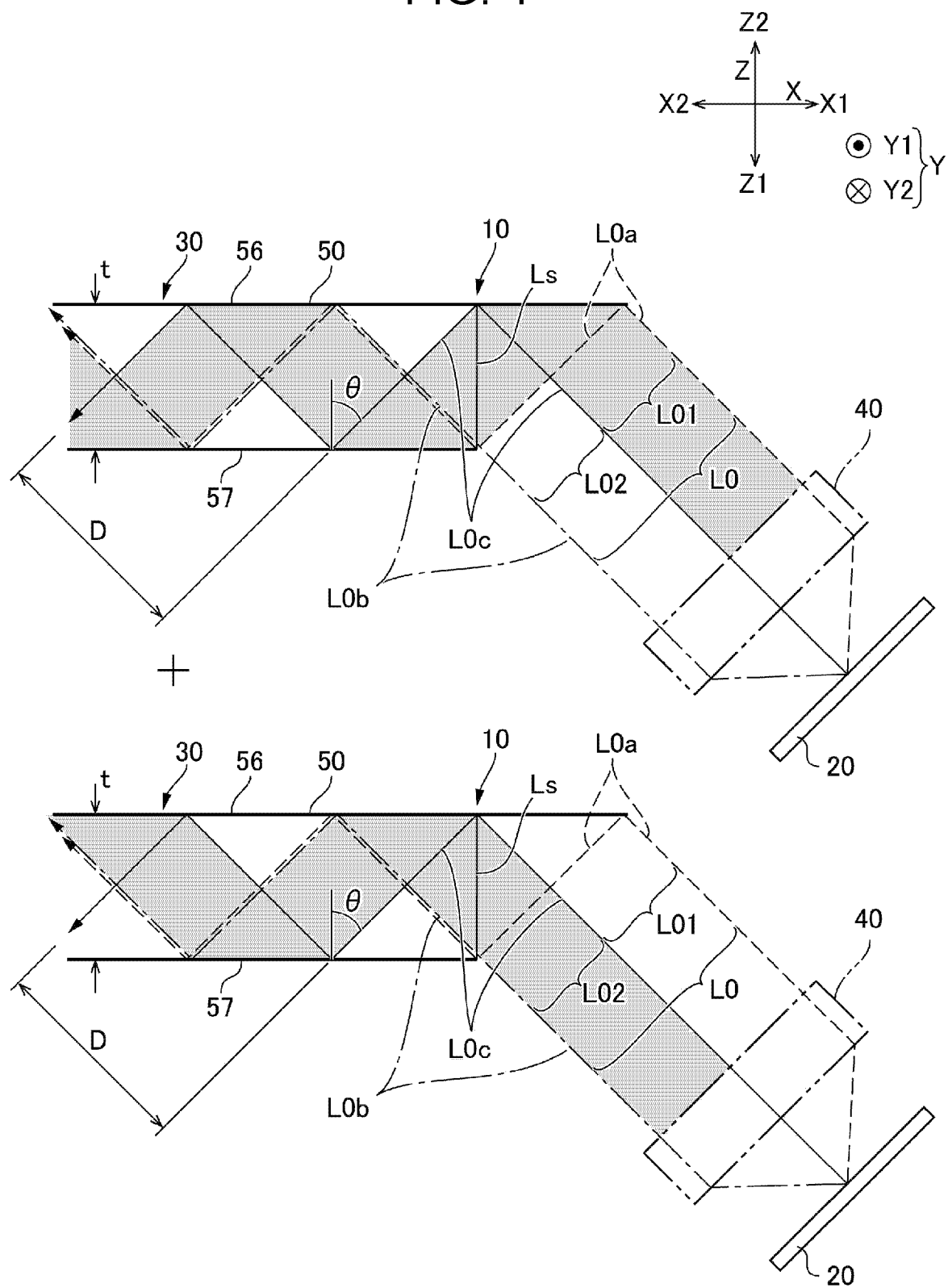
FIG. 4 is a schematic diagram for explaining how a parallel light flux proceeds in a light guide section shown in FIG. 2.

FIG. 4 is a schematic diagram for explaining how the parallel light flux proceeds in the light guide section 50 shown in FIG. 2. More specifically, FIG. 4 is a schematic view in the third direction Y showing a parallel light flux L0 (image light L), converted to the parallel light in the input section 40 from a non-parallel light flux, inputted from the same position of the image generation system 20 to the curved input surface 41 of the input section 40 through the projection lens system 70. In FIG. 4, a central light beam L0c of the parallel light flux L0 is indicated by solid lines, a first light beam L0a at an edge of the parallel light flux L0 is indicated by dash lines, and a second light beam L0b at the other edge of the parallel light flux L0 is indicated by dash-dot lines. Further, in the upper section of FIG. 4, a first portion L01 of the parallel light flux L0 between the central light beam L0c and the first light beam L0a is shaded, and a second portion L02 of the parallel light flux L0 between the central light beam L0c and the second light beam L0b is shaded, in the lower section in FIG. 4.

As shown in FIG. 4, the display section 10 is configured so that, when the parallel light flux L0, converted from the non-parallel light flux incident upon the curved input surface 41 of the input section 40 from the same position of the image generation system 20, is viewed in the third direction Y, the inside of one end portion on the X1 side in the first direction X, where the light guide section 50 and the input section 40 are connected, is filled with the parallel light flux L0. More specifically, since the parallel light flux L0 is composed of the first portion L01 between the central light beam L0c and the first light beam L0a (shaded portion in the upper section of FIG. 4) and the second portion L02 between the second light beam L0b and the central light beam L0c and the parallel light flux L0 (shaded portion in the lower section of FIG. 4), the inside of the light guide section 50 is filled with the parallel light flux L0. Therefore, even though the light guide section 50 is formed in a reduced thickness in the second direction Z, a virtual image having high luminance can be presented to the viewer.

The mentioned configuration can be attained, for example, by forming the first plane 56 and the second plane 57 parallel to each other, and arranging so as to satisfy a conditional expression of:

$$D = 2t \times \sin \theta,$$

where D represents the flux diameter of the parallel light flux L0, t represents the distance between the first plane 56 and the second plane 57 in the second direction Z, and θ represents the incident angle of the parallel light flux L0 upon the first plane 56 and the second plane 57.

In other words, the mentioned configuration can be attained by arranging such that the positions on the second plane 57, on which the first light beam L0a and the second light beam L0b are incident, fall on an imaginary normal Ls of the position on the first plane 56 on which the central light beam L0c is incident. Note that, although the image light L is outputted from various positions on the image generation system 20 as shown in FIG. 2, in this embodiment the image light L satisfies the foregoing condition, irrespective the position on the image generation system 20 from which the image light L is outputted.

Joint Structure

Referring again to FIG. 2, in this embodiment the input section 40 is formed in a first transparent member 61, and a region 54, where at least the plurality of partial reflection planes 55 of the light guide section 50 are provided, is formed in a second transparent member 62 surface-joined to the first transparent member 61 in the first direction X, via a joint interface 63. The joint interface 63 is located between the partial reflection plane 55 closest to the end portion 51, and the input section 40. Such a configuration allows the input section 40 and the partial reflection plane 55 to be each manufactured by a suitable method, such as forming the input section 40 from a resin molded material constituted of cycloolefin polymer or the like, while forming the region 54 of the light guide section 50, where the plurality of partial reflection planes 55 are provided, by connecting a transparent substrate including the partial reflection planes 55 interposed therein, as will be subsequently described with reference to FIG. 7. In this embodiment, the joint interface 63 is located in the middle point between the region 54 of the light guide section 50, where the plurality of partial reflection planes 55 are provided, and the input section 40.

Further, the joint interface 63 is oriented such that a first joint edge 631, which is the end portion on the Z2 side in the second direction Z, is located on the side of the end portion 51, with respect to a second joint edge 632 which is the end portion on the Z1 side in the second direction Z. The joint interface 63 constitutes a plane inclined in the same direction as the partial reflection planes 55, in other words parallel to the partial reflection plane 55, in this embodiment.

Configuration of Third Plane 520

The third plane 520 is oriented such that a first edge 521 on the Z2 side in the second direction Z is located on the side of the end portion 51, with respect to a second edge 522 on the Z1 side in the second direction Z. The third plane 520 constitutes a plane inclined in the same direction as the partial reflection planes 55, in other words parallel to the partial reflection plane 55, in this embodiment.

Detailed Configuration of Partial Reflection Surface 55

Figure 5:
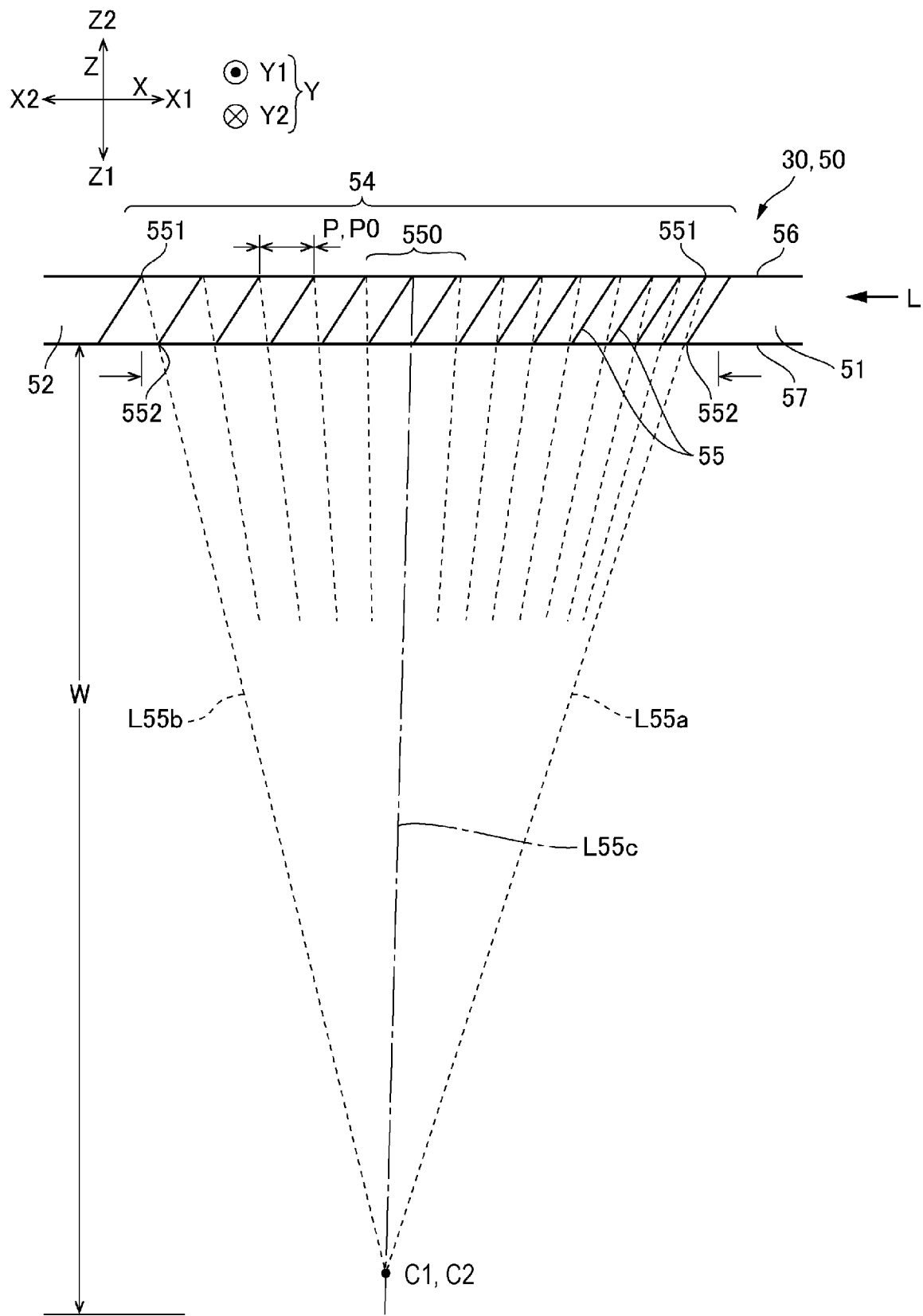
FIG. 5 is a schematic diagram for explaining a partial reflection plane shown in FIG. 2.
Figure 6:
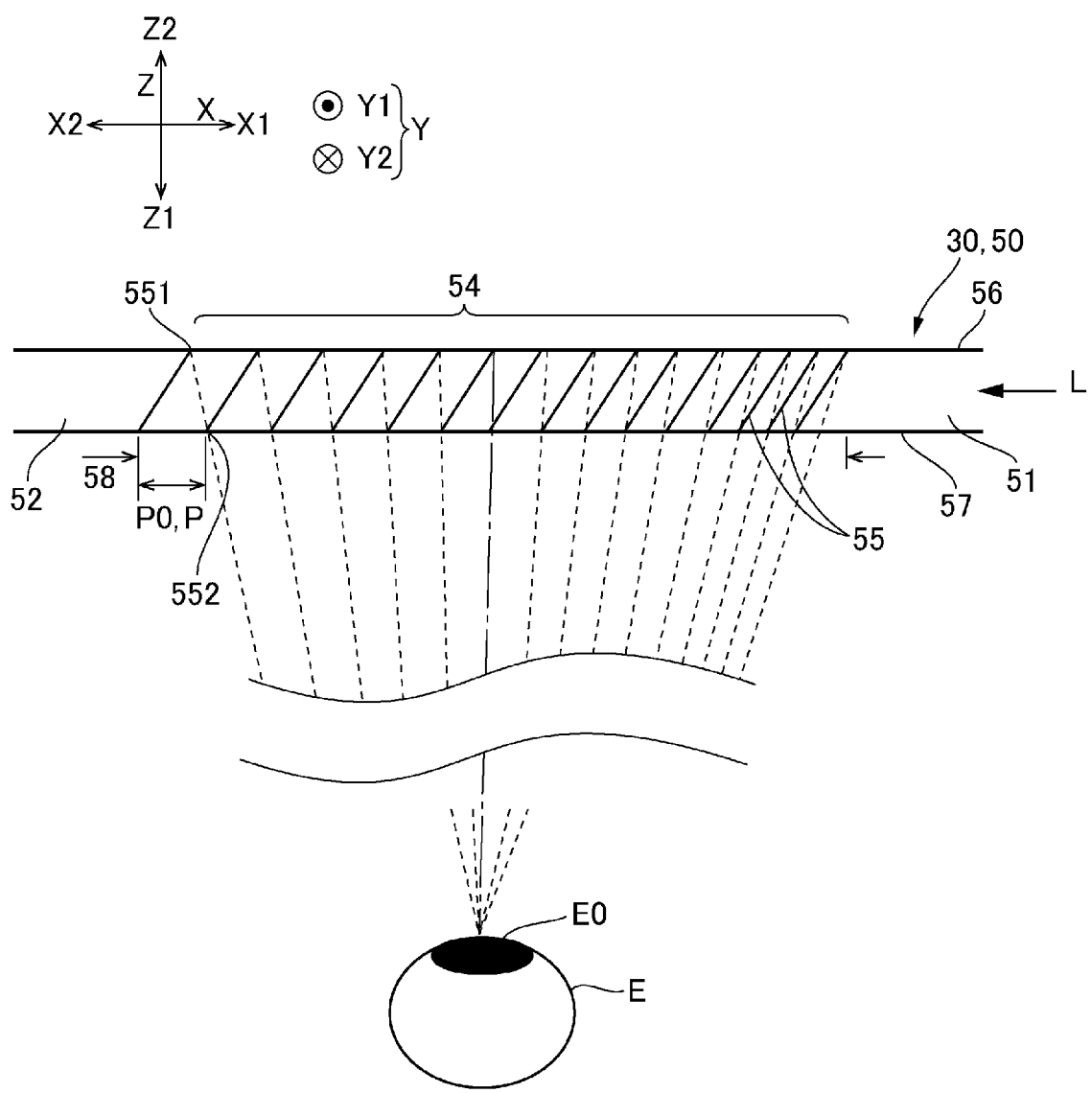
FIG. 6 is a schematic diagram for explaining the partial reflection plane shown in FIG. 5, viewed by an eye of a viewer.
Figure 13:
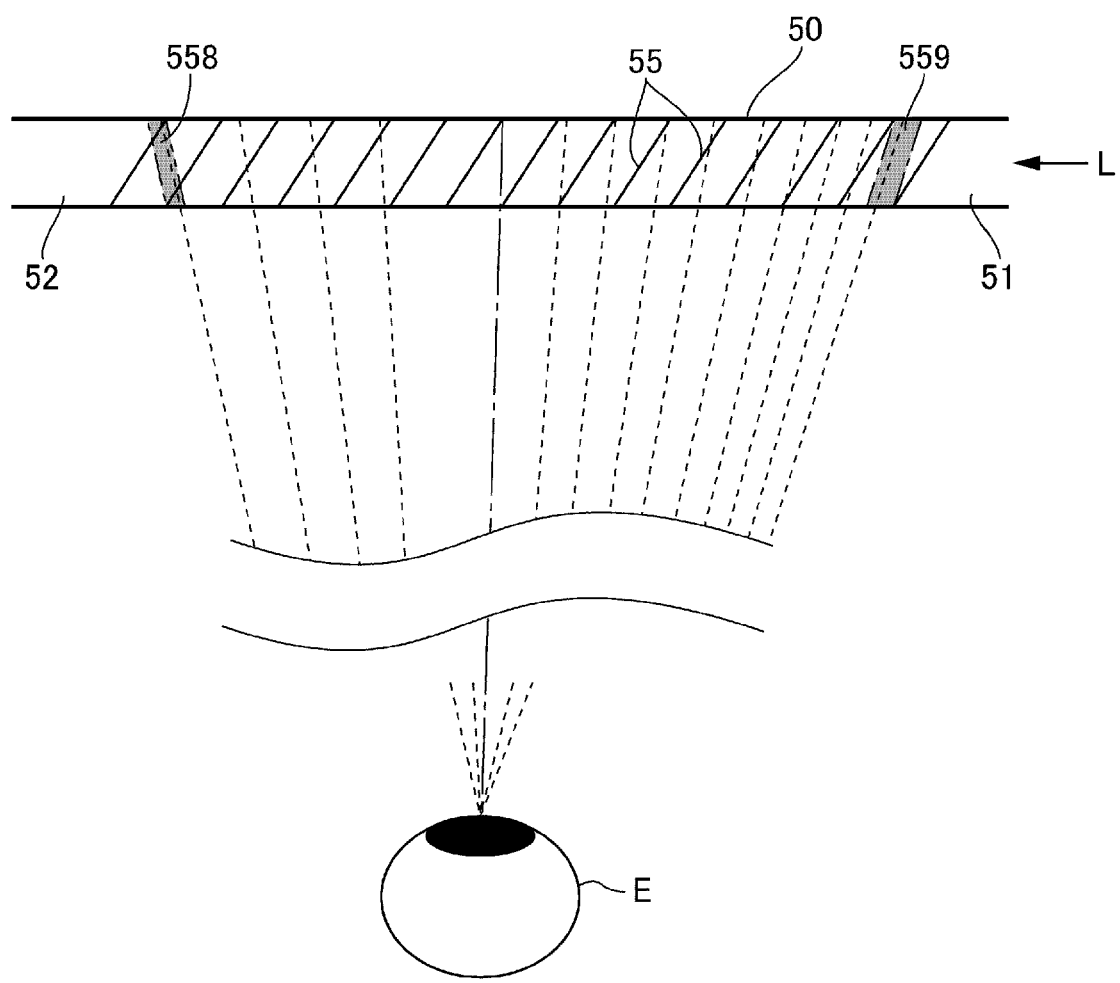
FIG. 13 is a schematic diagram for explaining a partial reflection plane formed in a light guide device according to a comparative example.

FIG. 5 is a schematic diagram for explaining the partial reflection plane 55 shown in FIG. 2. FIG. 6 is a schematic diagram for explaining the partial reflection plane 55 shown in FIG. 5, viewed from the eye E. In FIG. 5 and FIG. 6, an imaginary line passing a first end portion 551 and a second end portion 552, and a line of sight from the eye E toward the light guide section 50 (output section 58) are indicated by dotted lines. Referring to FIG. 5, in the light guide system 30 the partial reflection planes 55 are configured so as to satisfy the following condition, when the pitch between the partial reflection planes 55 adjacent to each other in the first direction X is denoted by P, the end portion of the partial reflection plane 55 on the Z2 side in the second direction Z is defined as the first end portion 551, and the end portion of the partial reflection plane 55 on the Z1 side in the second direction Z is defined as the second end portion 552. In this embodiment, first, the pitches among the plurality of partial reflection planes 55 in the first direction X are widened, toward the other end portion 52, from the side of the end portion 51. Since the end portion 51 is located on the side of the right ear and the other end portion 52 is located on the side of the nose, the pitches between the partial reflection planes 55 are widened toward the nose, from the side of the right ear. Therefore, in a view from the eye E of the viewer, the overlapping portion 558 where the partial reflection planes 55 overlap, described earlier with reference to FIG. 13, is narrow or non-existent between two of the partial reflection planes 55 adjacent to each other close to the other end portion 52 of the light guide section 50, as shown in FIG. 6. In addition, the gap 559, described with reference to FIG. 13, is narrow or non-existent between two of the partial reflection planes 55 adjacent to each other close to the end portion 51 of the light guide section 50.

Therefore, appearance of a line having high luminance in the image, at the position corresponding to the overlapping portion 558, can be suppressed. In addition, appearance of a line-shaped portion where the image light is absent, originating from the gap 559, can be suppressed. Such configurations prevent degradation in image quality, originating from the overlapping portion 558 or the gap 559 between the partial reflection planes 55 adjacent to each other, to thereby allow the viewer to recognize an image of high quality.

In addition, as shown in FIG. 5, between two of the partial reflection planes 55 adjacent to each other located on the side of the end portion 51, with respect to a central portion 550, in the first direction X, of the region 54 where the plurality of partial reflection planes 55 are provided, the second end portion 552 of the partial reflection plane 55 on the side of the end portion 51 is located on the side of the other end portion 52, with respect to the first end portion 551 of the partial reflection plane 55 on the side of the other end portion 52. Therefore, in the view from the eye E of the viewer, the gap 559 described with reference to FIG. 13 is extremely narrow or non-existent, between the two partial reflection planes 55 adjacent to each other close to the end portion 51 of the light guide section 50, as shown in FIG. 6.

Further, as shown in FIG. 6, between two of the partial reflection planes 55 adjacent to each other on the side of the other end portion 52 with respect to the central portion 550, the second end portion 552, of the partial reflection plane 55 on the side of the end portion 51, is located on the side of the end portion 51, with respect to the first end portion 551 of the partial reflection plane 55 on the side of the other end portion 52. Therefore, in the view from the eye E of the viewer, the overlapping portion 558 where the partial reflection planes 55 overlap, described with reference to FIG. 13, is extremely narrow or non-existent, between the two partial reflection planes 55 adjacent to each other close to the other end portion 52 of the light guide section 50, as shown in FIG. 6.

Referring again to FIG. 5, the plurality of partial reflection planes 55 are configured such that an imaginary straight line, passing the second end portion 552 of one partial reflection plane 55 on the side of the end portion 51, out of two partial reflection planes 55 adjacent to each other, and the first end portion 551 of the other of the two partial reflection planes 55, satisfies the following condition. First, a first intersection C1 of an imaginary straight line L55c between the two partial reflection planes 55 located in the central portion 550, and an imaginary straight line L55a between the two partial reflection planes 55 on the side of the end portion 51 with respect to the central portion 550, is located in a range W of 5 mm to 50 mm, from the second plane 57 toward the Z1 side in the second direction Z. Second, a second intersection C2 of the imaginary straight line L55c between the two partial reflection planes 55 located in the central portion 550, and an imaginary straight line L55b between the two partial reflection planes 55 on the side of the other end portion 52 with respect to the central portion 550, is located in a range W of 5 mm to 50 mm, from the second plane 57 toward the Z1 side in the second direction Z. When the first and second intersections C1 and C2 are, for example, located approximately 5 mm from the second plane 57, the region 54 in the light guide section 50 where the plurality of partial reflection planes 55 are provided can be formed in a reduced width in the first direction X, which leads to reduction in size and weight of the display device 100. When the first and second intersections C1 and C2 are located approximately 50 mm from the second plane 57, the region 54 in the light guide section 50 where the plurality of partial reflection planes 55 are provided can be located distant from the eye E of the viewer in the second direction Z, and therefore, for example, a protective device such as a visor of a helmet, or glasses can be located between the display device 100 and the viewer.

Now, the range W corresponds to a range where a pupil E0 is supposed to be located, when the user wears the display device 100 on the head. Accordingly, when the first intersection C1 and the second intersection C2 are located so as to coincide with the pupil E0 as shown in FIG. 6, the imaginary straight lines L55a, L55b, L55c all pass the pupil E0. In this case, in the view from the eye E of the viewer, the gap 559 described with reference to FIG. 13 is non-existent, between the two partial reflection planes 55 adjacent to each other close to the end portion 51 of the light guide section 50, and the overlapping portion 558 described with reference to FIG. 13 is non-existent, between the two partial reflection planes 55 adjacent to each other close to the other end portion 52 of the light guide section 50. The pitches P that realize the foregoing configuration correspond to ideal pitch P0 widened toward the other end portion 52 of the light guide section 50, from the side of the end portion 51, and the ideal pitch P0 can be uniquely determined on the basis of the distance between the eye E and the light guide section 50, and the angle of view. It is preferable to set the ideal pitch P0 to a range of 0.3 mm to 2.5 mm. When the pitch between two partial reflection planes 55 adjacent to each other is set to 0.3 mm or shorter, the resolution of the image light L is lowered, owing to diffraction between the two partial reflection planes 55 adjacent to each other. In contrast, when the pitch between two partial reflection planes 55 adjacent to each other exceeds 2.5 mm, the thickness of the light guide section 50 in the second direction Z is increased, which may lead to excessive increase in weight of the display device 100. In this embodiment, each of the pitches P is set, as the ideal pitch P0, in a range of 0.9 mm to 2.0 mm, so as to become wider toward the other end portion 52 of the light guide section 50, from the side of the end portion 51.

Setting Example of Clearance P

Figure 7:
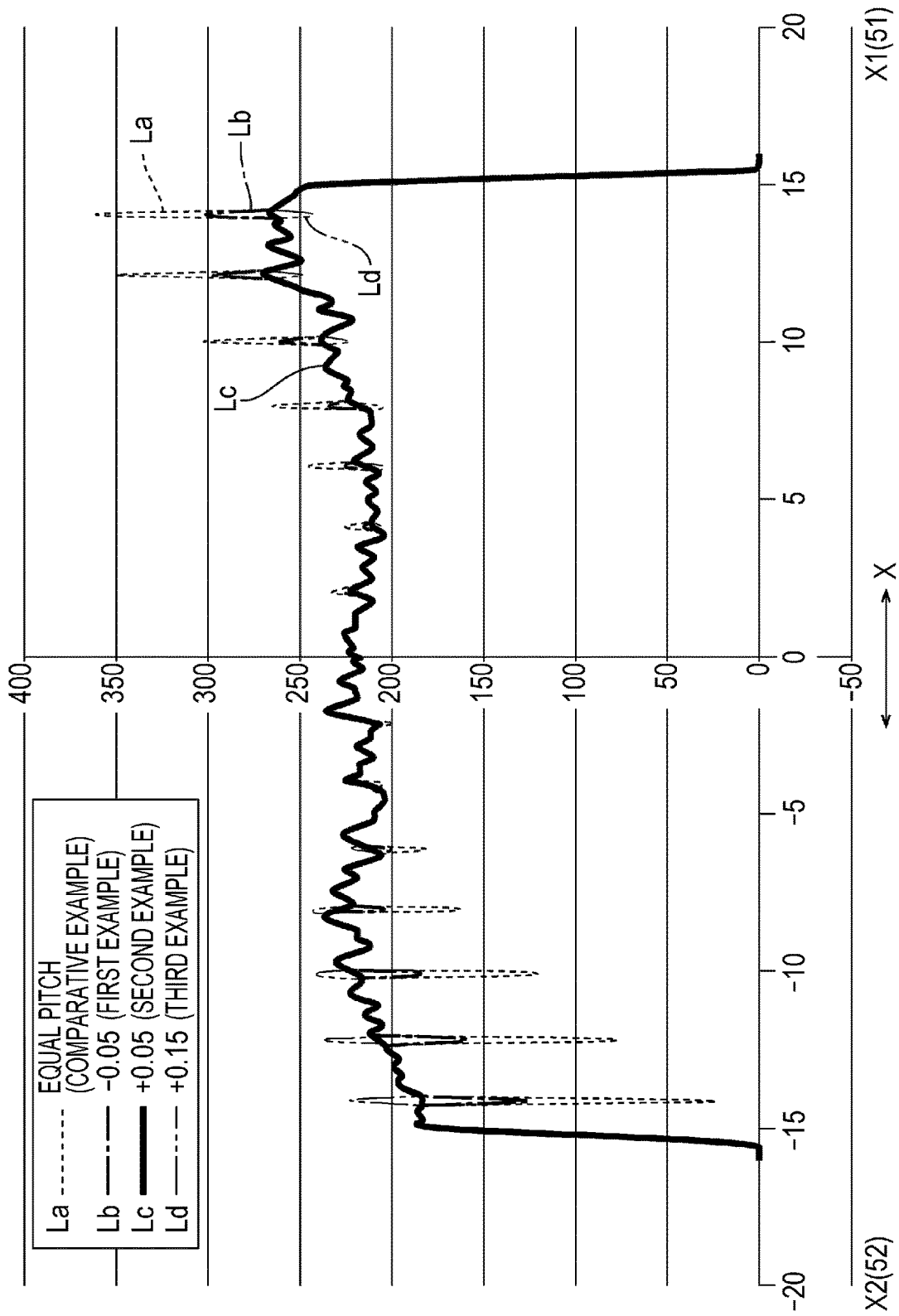
FIG. 7 is a graph showing a relation between the pitch of the partial reflection plane shown in FIG. 6 and luminance (luminance distribution) in a first direction.

FIG. 7 is a graph showing a relation between the pitch of the partial reflection planes 55 shown in FIG. 6 and the luminance distribution in the first direction, and indicating the following result. The result from the case where the pitches P are equal, as in the comparative example referred to earlier with reference to FIG. 13, is indicated by dotted lines La. The luminance distribution realized by narrowing each of the pitches P by 0.05 mm from the ideal pitches P0, which become wider toward the other end portion 52 of the light guide section 50 from the side of the end portion 51, is indicated by dash-dot lines Lb. The luminance distribution realized by widening each of the pitches P by 0.05 mm from the ideal pitches P0 is indicated by solid line Lc. The luminance distribution realized by widening each of the pitches P by 0.15 mm from the ideal pitches P0 is indicated by dash-dot-dot line Ld.

In this embodiment, the pupil E0 is assumed to have a width of 2 mm to 7 mm. It is also assumed that lights of different angles of view are inputted to the same partial reflection plane 55. Further, the pitches P may be set to discrete values, owing to a restriction from the viewpoint of the manufacturing process. Accordingly, modifying the ideal pitch P0 to determine the pitch P may provide a more appropriate luminance distribution. For such reason, the luminance distribution obtained from a first example, in which the pitches P are narrowed by 0.05 mm from the ideal pitches P0 (dash-dot line Lb), the luminance distribution obtained from a second example, in which the pitches P are widened by 0.05 mm from the ideal pitches P0 (solid line Lc), and the luminance distribution obtained from a third example, in which the pitches P are widened by 0.15 mm from the ideal pitches P0 (dash-dot-dot line Ld) were calculated, and the calculation result is shown in FIG. 7 for comparison. FIG. 7 also includes the luminance distribution obtained from the comparative example, in which the pitches P are equal (dotted line La).

As is apparent from FIG. 7, the unevenness of luminance, originating from the overlapping portion 558 and the gap 559 described with reference to FIG. 13, is less prominent in the case of the first example, the second example, and the third example based on this embodiment, than in the case of the comparative example. In addition, through comparison among the first example, the second example, and the third example, the luminance distribution is more desirable in the descending order of the second example, the first example, and the third example. Through repetitions of the similar studies, it has proved that it is preferable to set the pitches P of the actual partial reflection planes 55 (pitches P of the partial reflection planes 55 to be actually manufactured) so as to satisfy the following condition.

$$P0-P0/2 \leq P \leq P0+P0/2$$

Further, the plurality of partial reflection planes 55 may be aligned such that each of the pitches P becomes wider toward the other end portion 52 from the side of the end portion 51, or the partial reflection planes may be aligned such that the pitches P become wider for every plurality of partial reflection planes, toward the other end portion 52 from the side of the end portion 51. In other words, the plurality of partial reflection planes 55 may be formed such that all of the pitches P become sequentially wider toward the other end portion 52 from the side of the end portion 51. Alternatively, the plurality of partial reflection planes 55 may be formed such that groups, each including a plurality of partial reflection planes 55 aligned at equal pitches P, are aligned in the ascending order of the pitch P, toward the other end portion 52 from the side of the end portion 51. Further, one or more groups each including a plurality of partial reflection planes 55 aligned at equal pitches P may be located among the plurality of partial reflection planes 55 aligned such that each of the pitches P becomes wider toward the other end portion 52 from the side of the end portion 51.

Manufacturing Method of Light Guide Section 50

Figure 8:
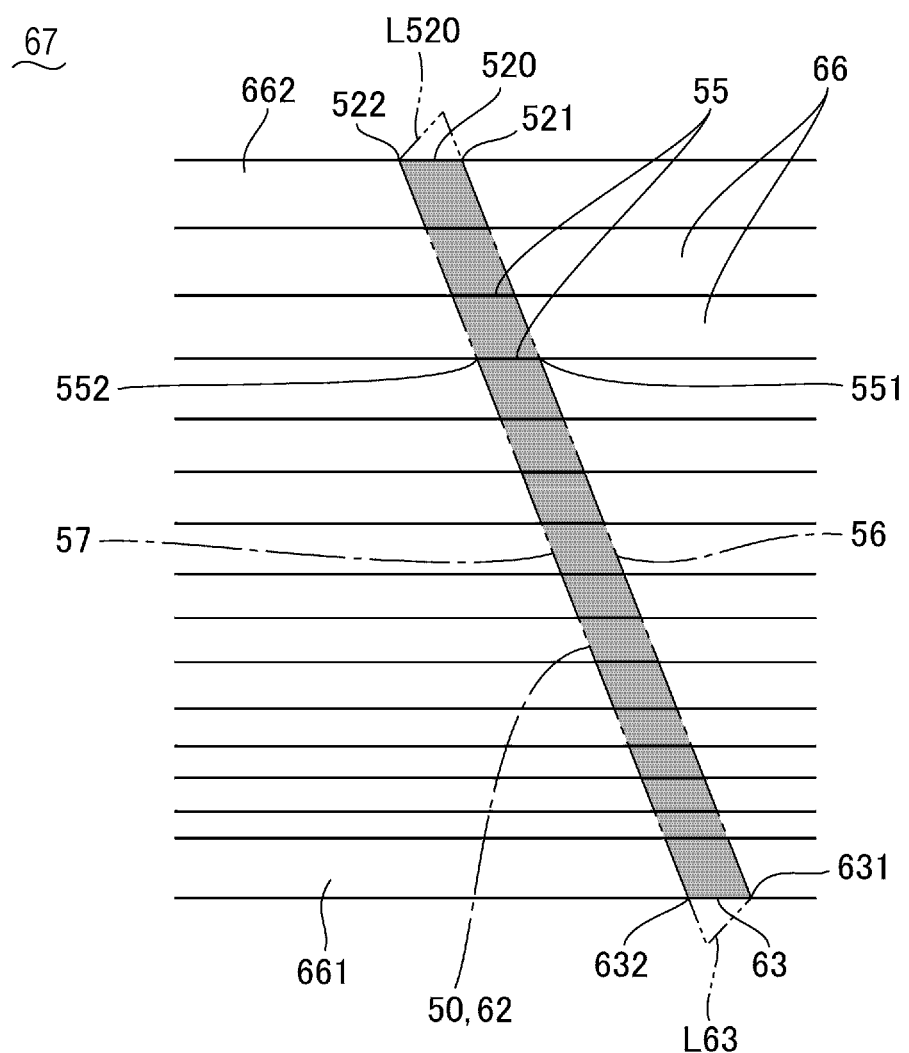
FIG. 8 is a schematic drawing for explaining a manufacturing method of the light guide section shown in FIG. 2.

FIG. 8 is a schematic drawing for explaining a manufacturing method of the light guide section 50 shown in FIG. 2. To manufacture the light guide section 50 (second transparent member 62) shown in FIG. 2, a plurality of transparent substrates 66, each having the partial reflection plane 55 formed on a surface thereof, are stacked as shown in FIG. 8, and the transparent substrates 66 are bonded together via an adhesive layer by imposing a load, so as to form a laminate body 67. This process also includes stacking the transparent substrates 66 on which the partial reflection plane 55 is not formed. Then the laminate body 67 is obliquely cut. At this point, the light guide section 50 (second transparent member 62) is obtained. Since the cut surface constitutes the first plane 56 and the second plane 57, the cut surface is polished. In addition, the pitches P of the partial reflection planes 55 can be adjusted as described with reference to FIG. 5 and FIG. 6, by stacking the plurality of transparent substrates 66 having different thicknesses. The transparent substrate 66 may be formed of, for example, glass, quartz, or a resin. In the case where glass is adopted to form the transparent substrate 66, glass bonding can be performed, and therefore an adhesive is unnecessary. Alternatively, an adhesive may be employed to bond the transparent substrates 66.

The joint interface 63 and the third plane 520 are respectively formed of the transparent substrates 661 and 662 on the upper and lower ends of the laminate body. Accordingly, the thickness of the transparent substrate 661 is determined according to the distance between the joint interface 63 and the partial reflection plane 55, and the thickness of the transparent substrate 662 is determined according to the distance between the third plane 520 and the partial reflection plane 55. In this embodiment, the joint interface 63 and the third plane 520 are inclined in the same direction as the partial reflection planes 55. Therefore, in the case of forming the joint interface 63 by processing the transparent substrate 661 on an end portion of the plurality of transparent substrates 66, there is no need to form the transparent substrate 661 with an additional thickness, unlike in the case where the joint interface 63 is inclined in the opposite direction to the partial reflection planes 55 as indicated by a dash-dot-dot line L63. Likewise, in the case of forming the third plane 520 by processing the transparent substrate 662 on the other end portion of the plurality of transparent substrates 66, there is no need to form the transparent substrate 662 with an additional thickness, unlike in the case where the third plane 520 is inclined in the opposite direction to the partial reflection planes 55 as indicated by a dash-dot-dot line L520.

In this embodiment, in particular, the joint interface 63 and the third plane 520 are parallel to the partial reflection planes 55. Accordingly, it suffices to polish the transparent substrate 661, and there is no need to perform other processing such as adjustment of the angle. Likewise, there is no need to perform a processing such as adjustment of the angle, on the transparent substrate 662. Thus, the light guide section 50 (second transparent member 62), having the joint interface 63 and the third plane 520 formed on the respective end portions, can be manufactured at a low cost, and therefore the cost of the display section 10 (display device 100) can be reduced.

Second Embodiment

Figure 9:
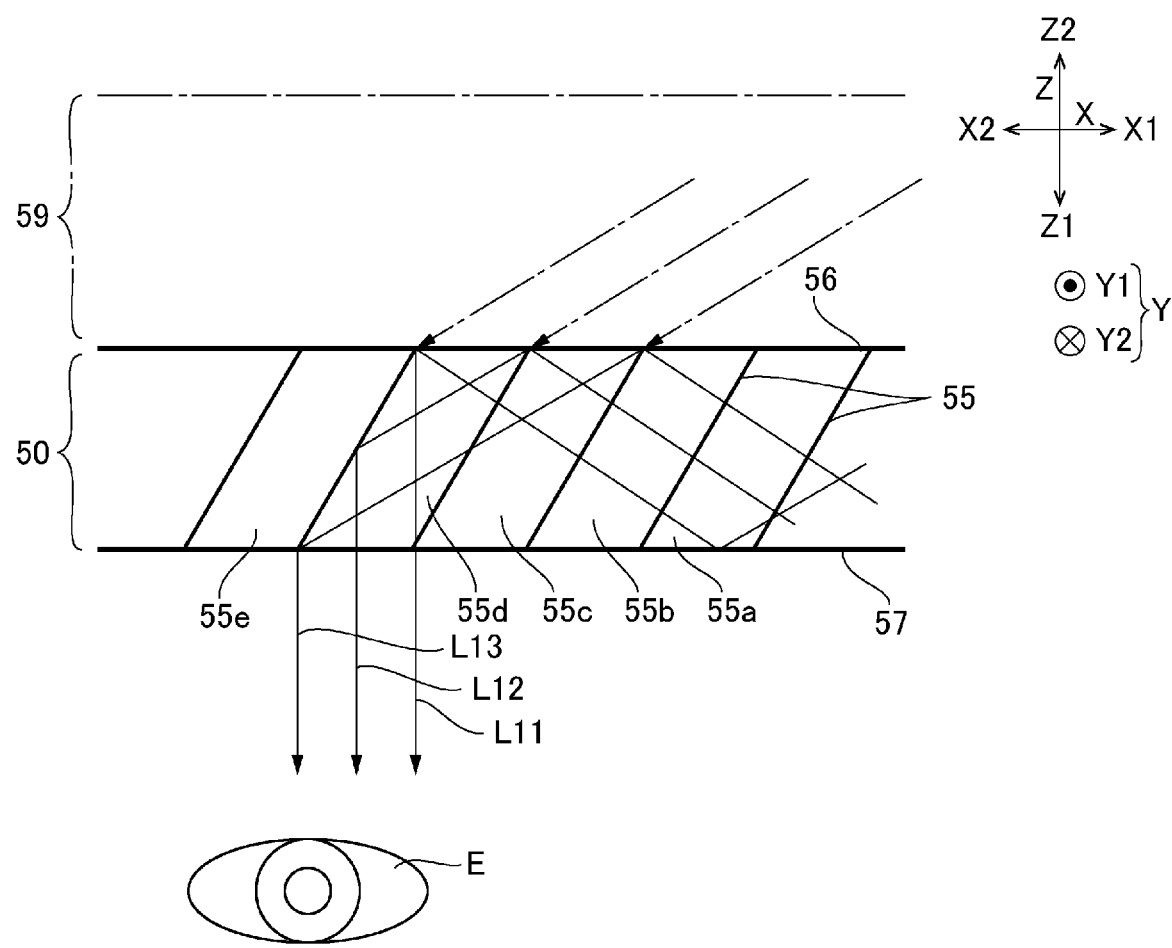
FIG. 9 is a schematic diagram for explaining a light guide section of a display device according to a second embodiment.

FIG. 9 is a schematic diagram for explaining the light guide section 50 of the display device 100 according to a second embodiment. In this embodiment, the partial reflection planes 55 formed in the light guide section 50 formed in FIG. 2 have a characteristic to vary transmittance and reflectance, depending on the incident angle. The plurality of partial reflection planes 55 exhibit higher reflectance when the incident angle is larger, than when the incident angle is small, in this embodiment.

In this embodiment, the partial reflection planes 55 define an angle of 45° to 70°, with respect to the second plane 57. When the incident angle on the partial reflection plane 55 is small, the transmittance is 98% or higher, and the reflectance is 2% or lower. In contrast, when the incident angle on the partial reflection plane 55 is large, the transmittance is lowered to 77%, and the reflectance rises to 23%. Giving such a characteristic to the partial reflection plane 55 leads to reducing the luminance unevenness of the image light L outputted from various positions of the output section 58 in the first direction X, as described hereunder with reference to Table 1, Table 2, and Table 3. More specifically, although the emission intensity of the image light L outputted from the output section 58 tends to be lower, at a position more distant from the input section 40 in the first direction X, the configuration according to this embodiment suppresses the decline of the emission intensity.

TABLE 1

| OUTGOING POSITION | LIGHT BEAM | NUMBER OF TIMES OF TRANSMISSION | | NUMBER OF TIMES OF REFLECTION | LUMINANCE (%) |
|---|---|---|---|---|---|
| | | INCIDENT ANGLE LARGE TRANSMITTANCE 77% | INCIDENT ANGLE SMALL TRANSMITTANCE 98% | AT LARGE INCIDENT ANGLE REFLECTANCE = 23% | |
| CLEARANCE 55a | L11 | 0 | 0 | 1 | 23.0 |
| | L12 | 0 | 0 | 1 | 23.0 |
| | L13 | 0 | 0 | 1 | 23.0 |
| CLEARANCE 55b | L11 | 0 | 1 | 1 | 22.5 |
| | L12 | 1 | 0 | 1 | 17.7 |
| | L13 | 1 | 0 | 1 | 17.7 |
| CLEARANCE 55c | L11 | 0 | 2 | 1 | 22.1 |
| | L12 | 1 | 1 | 1 | 17.4 |
| | L13 | 2 | 0 | 1 | 13.6 |
| CLEARANCE 55d | L11 | 0 | 3 | 1 | 21.6 |
| | L12 | 1 | 2 | 1 | 17.0 |
| | L13 | 2 | 1 | 1 | 13.4 |
| CLEARANCE 55e | L11 | 1 | 3 | 1 | 16.7 |
| | L12 | 1 | 3 | 1 | 16.7 |
| | L13 | 2 | 2 | 1 | 13.1 |

TABLE 2

| OUTGOING POSITION | LIGHT BEAM | NUMBER OF TIMES OF TRANSMISSION TRANSMITTANCE = 77% | NUMBER OF TIMES OF REFLECTION REFLECTANCE = 23% | LUMINANCE (%) |
|---|---|---|---|---|
| CLEARANCE 55a | L11 | 0 | 1 | 23.0 |
| | L12 | 0 | 1 | 23.0 |
| | L13 | 0 | 1 | 23.0 |
| CLEARANCE 55b | L11 | 1 | 1 | 17.7 |
| | L12 | 1 | 1 | 17.7 |
| | L13 | 1 | 1 | 17.7 |
| CLEARANCE 55c | L11 | 2 | 1 | 13.6 |
| | L12 | 2 | 1 | 13.6 |
| | L13 | 2 | 1 | 13.6 |
| CLEARANCE 55d | L11 | 3 | 1 | 10.5 |
| | L12 | 3 | 1 | 10.5 |
| | L13 | 3 | 1 | 10.5 |
| CLEARANCE 55e | L11 | 4 | 1 | 8.1 |
| | L12 | 4 | 1 | 8.1 |
| | L13 | 4 | 1 | 8.1 |

TABLE 3

| OUTGOING POSITION | LIGHT BEAM | NUMBER OF TIMES OF TRANSMISSION TRANSMITTANCE = 77% | NUMBER OF TIMES OF REFLECTION REFLECTANCE = 23% | LUMINANCE (%) |
|---|---|---|---|---|
| CLEARANCE 55a | L11 | 0 | 1 | 23.0 |
| | L12 | 0 | 1 | 23.0 |
| | L13 | 0 | 1 | 23.0 |
| CLEARANCE 55b | L11 | 0 | 1 | 23.0 |
| | L12 | 1 | 1 | 17.7 |
| | L13 | 1 | 1 | 17.7 |
| CLEARANCE 55c | L11 | 0 | 1 | 23.0 |
| | L12 | 0 | 1 | 17.7 |
| | L13 | 2 | 1 | 13.6 |
| CLEARANCE 55d | L11 | 0 | 1 | 23.0 |
| | L12 | 1 | 1 | 17.7 |
| | L13 | 2 | 1 | 13.6 |
| CLEARANCE 55e | L11 | 0 | 1 | 23.0 |
| | L12 | 1 | 1 | 17.7 |
| | L13 | 2 | 1 | 13.6 |

For example, calculation results of the calculation result of the luminance (emission intensity) of the light outputted from each of clearances between the partial reflection planes 55 shown in FIG. 2 are shown in Table 1, from which it can be understood that the luminance unevenness of the image light L outputted from various positions of the output section 58 in the first direction X can be reduced. Table 1 indicates the number of times of transmission and the number of times of reflection that are necessary until the image light L is outputted from each of the clearances 55a, 55b, 55c, 55d, and 55e between the partial reflection planes 55 shown in FIG. 9. Regarding the number of times of reflection, the reflection is ultimately made with a large incident angle. On the other hand, the transmission is made with both a large incident angle and a small incident angle, and the transmittance through the partial reflection plane 55 differs depending on the incident angle, in this embodiment. Therefore, the number of times of transmission is classified into the cases where the incident angle is large and where the incident angle is small. Regarding the light beam, the luminance is indicated with respect to a light beam L11 outputted from the position closest to the X1 side in the first direction X, a light beam L12 outputted from the central position in the first direction X, and a light beam L13 outputted from the position closest to the other side X2 in the first direction X, from each of the clearances 55a, 55b, 55c, 55d, and 55e, as shown in FIG. 9.

As is apparent from Table 1, the luminance of the light beams outputted from each of the clearances 55*a*, 55*b*, 55*c*, 55*d*, and 55*e* is 13.1% to 23%, which is not largely uneven. In addition, the unevenness of the luminance among the light beams L11, L12, and L13 is also small, in each of the clearances 55*a*, 55*b*, 55*c*, 55*d*, and 55*e*. In contrast, when the transmittance of the partial reflection plane 55 is 77% and the reflectance is 23% irrespective of the incident angle on the partial reflection plane 55, the luminance of the light beams L11, L12, and L13 outputted from each of the clearances 55*a*, 55*b*, 55*c*, 55*d*, and 55*e* is as shown in Table 2. As is apparent from Table 2, the luminance of the light beams L11, L12, and L13 outputted from each of the clearances 55*a*, 55*b*, 55*c*, 55*d*, and 55*e* is 8.1% to 23%, and thus the unevenness is larger.

Further, when a transparent layer 59 without the partial reflection plane 55 is provided on the Z2 side of the light guide section 50 including the partial reflection planes 55 as shown in FIG. 9, the number of times of transmission through the partial reflection plane 55 can be reduced. Therefore, when the transmittance of the partial reflection plane 55 is 77% and the reflectance is 23% irrespective of the incident angle on the partial reflection plane 55, the luminance of the light beams L11, L12, and L13 outputted from each of the clearances 55*a*, 55*b*, 55*c*, 55*d*, and 55*e* is as shown in Table 3. As is apparent from Table 3, the luminance of the light beams outputted from each of the clearances 55*a*, 55*b*, 55*c*, 55*d*, and 55*e* is 13.1% to 23%, which is not largely uneven. In this case, however, the thickness of the light guide system 30 in the second direction Z is increased, owing to the presence of the transparent layer 59.

As described above, the difference in luminance of the image light L, outputted from the position on the output section 58 spaced from the input section 40 in the first direction X, can be reduced, despite forming the display section 10 only with the light guide section 50 including the partial reflection planes 55 as in this embodiment, without adding the transparent layer 59 not having the partial reflection plane 55 (see FIG. 9), so as to avoid an increase in thickness. In addition, the unevenness of the luminance among the light beams L11, L12, and L13 can also be reduced, in each of the clearances 55*a*, 55*b*, 55*c*, 55*d*, and 55*e*. Further, useless reflection by the partial reflection plane 55 is reduced, and therefore degradation in display quality originating from appearance of a ghost can be prevented.

Third Embodiment

In the second embodiment, the partial reflection planes 55 are configured so as to exhibit higher reflectance when the incident angle thereon is larger, than when the incident angle thereon is smaller. However, for example when the partial reflection plane 55 is oriented so as to define an angle of 25° to 40° with respect to the second plane 57, the partial reflection plane 55 may be configured to exhibit higher reflectance when the incident angle thereon is smaller, than when the incident angle thereon is larger.

Fourth Embodiment

Figure 10:
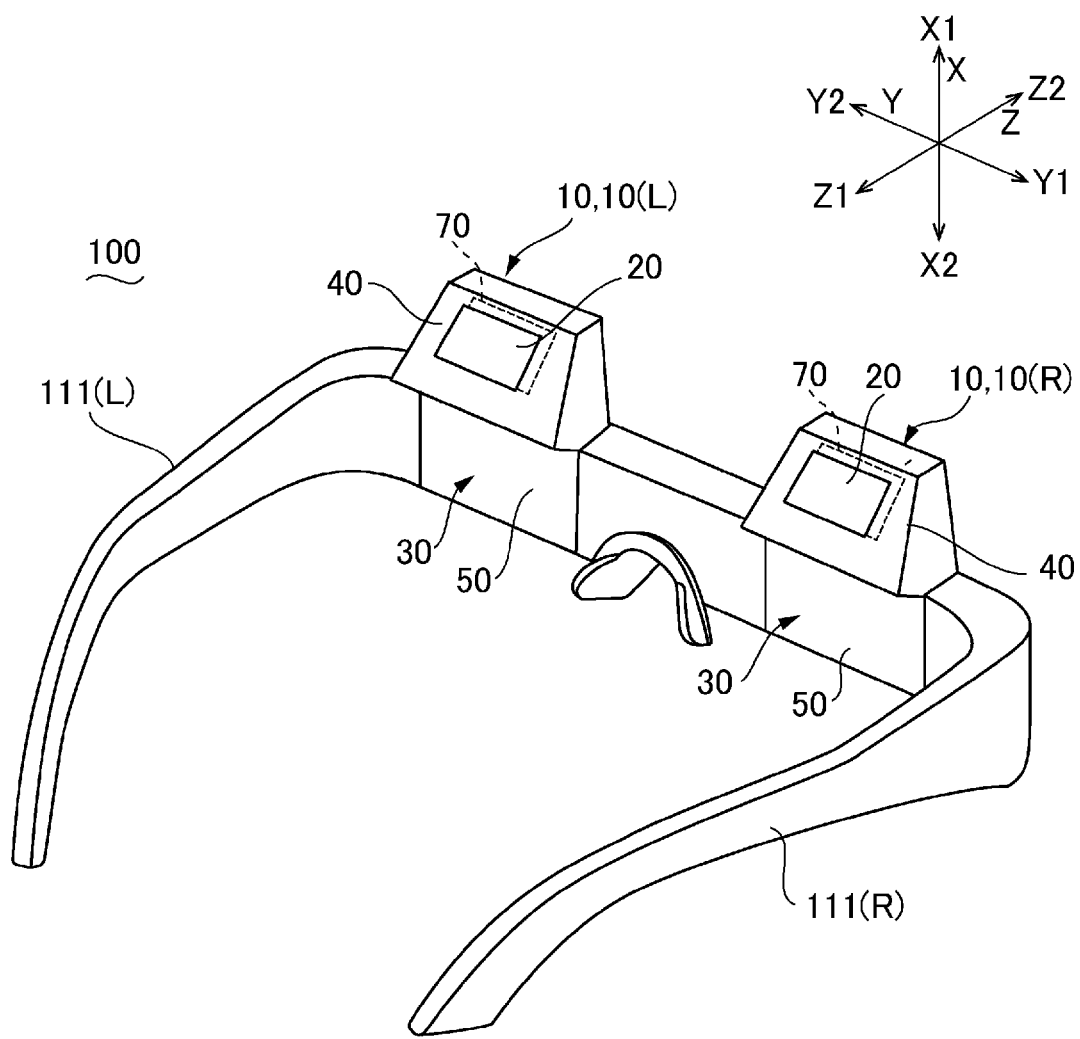
FIG. 10 is a schematic perspective view showing an example of appearance of a display device according to a fourth embodiment.
Figure 11:
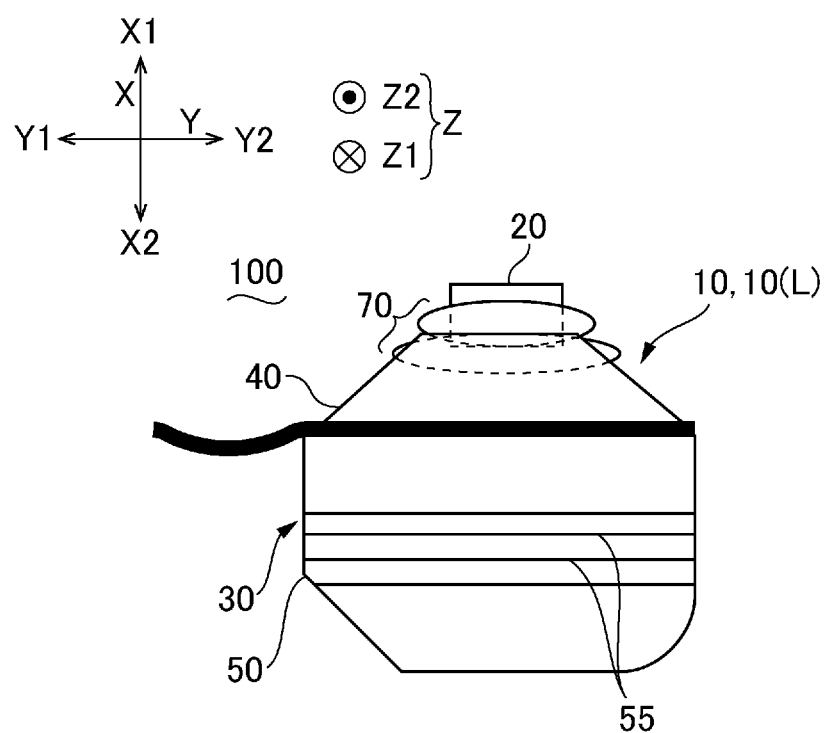
FIG. 11 is a partial front view of the display device shown in FIG. 10, viewed from a position opposite to the viewer.
Figure 12:
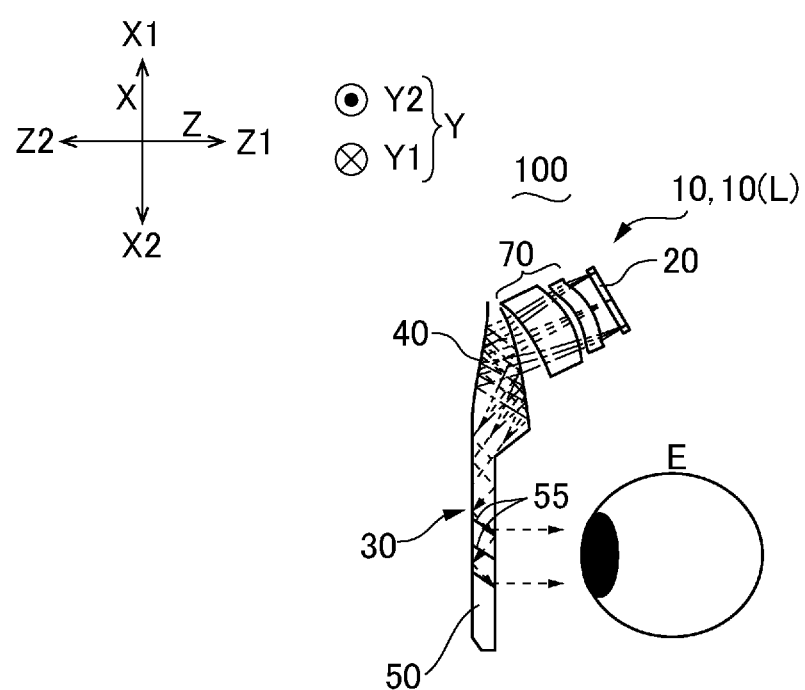
FIG. 12 is a left side view of the display device shown in FIG. 10.

FIG. 10 is a schematic perspective view showing an example of appearance of the display device 100 according to a fourth embodiment. FIG. 11 is a partial front view of the display device 100 shown in FIG. 10, viewed from a position opposite to the viewer. FIG. 12 is a left side view of the display device 100 shown in FIG. 10. In the display device 100 according to the first embodiment, the image generation system 20 and the input section 40 are located on the side of the ears, to lead the image light L from the side of the ear to the side of the nose. In this embodiment, instead, the image generation system 20 and the input section 40 are located at an upper position forward of the eyes, and the light guide section 50 extends downward from the upper position, as shown in FIG. 10, FIG. 11, and FIG. 12. Accordingly, the image light L is led downward from the upper position, to be outputted toward the eye. In this embodiment, therefore, the up-down direction corresponds to the first direction X, the front-back direction corresponds to the second direction Z, and the left-right direction corresponds to the third direction Y. Likewise, the X1 side in the first direction X corresponds to the upper side, and the other side X2 in the first direction X corresponds to the lower side. In this case, the pitches P described with reference to FIG. 5 and FIG. 6 are widened toward the X2 side (lower side) in the first direction, from the X1 side (upper side).

Additional Embodiment

In the foregoing embodiments, the first plane 56 or the second plane 57 may be provided with an anti-reflection film. When the outside light (see-through light) is transmitted, and also when the image light L is outputted from the light guide section 50, reflection at the surface of the light guide section 50 results in a loss corresponding to the amount of the reflected light. Therefore, providing the anti-reflection film leads to improved luminance, with respect to both of the see-through light and the image light L. In addition, optical feedback of useless light can be reduced, and therefore appearance of a ghost can also be prevented.

The entire disclosure of Japanese Patent Application No.: 2017-062399, filed Mar. 28, 2017 and 2017-250698, filed Dec. 27, 2017 are expressly incorporated by reference herein.

What is claimed is:
1. A light guide device comprising:
a transparent light guide section configured to lead light inputted through a first end portion to an output section, the transparent light guide section including:
a first plane extending from the first end portion toward a second end portion in a first direction;
a second plane located on one side of the first plane in a second direction intersecting the first direction, the second plane extending parallel to the first plane in the first direction; and
a plurality of partial reflection planes aligned in the first direction between the first plane and the second plane, the plurality of partial reflection planes being inclined at a same angle toward the first end portion with respect to a normal direction of the second plane, and the plurality of partial reflection planes having a plurality of pitches between adjacent partial reflection planes of the plurality of partial reflection planes that widen in the first direction from a side of the first end portion toward a side of the second end portion.
2. The light guide device according to claim 1, wherein:
a first partial reflection plane end portion of each partial reflection plane of the plurality of partial reflection planes is on a side of the second end portion in the second direction, a second partial reflection plane end portion of each partial reflection plane of the plurality of partial reflection planes is on a side of the first end portion in the second direction, between adjacent partial reflection planes disposed on the side of the first end portion with respect to a central portion and in the first direction of a region where the plurality of partial reflection planes are disposed, the second partial reflection plane end portion is disposed on the side of the second end portion with respect to the first partial reflection plane end portion, and between the adjacent partial reflection planes disposed on the side of the second end portion with respect to the central portion, the second partial reflection plane end portion is located on the side of the first end portion with respect to the first partial reflection plane end portion.

3. The light guide device according to claim 2, wherein:

an imaginary straight line is drawn so as to pass the second partial reflection plane end portion of one partial reflection plane of the adjacent partial reflection planes, and the first partial reflection plane end portion of another of the adjacent partial reflection panes, a first intersection of the imaginary straight line is disposed between two partial reflection planes of the plurality of partial reflection planes and located in the central portion, and the imaginary straight line is disposed between the two partial reflection planes of the plurality of partial reflection planes and located on the side of the first end portion with respect to the central portion, a second intersection of the imaginary straight line is disposed between the two partial reflection planes of the plurality of partial reflection planes and located in the central portion, and the imaginary straight line is disposed between the two partial reflection planes of the plurality of partial reflection planes and located on the side of the second end portion with respect to the central portion, and the first intersection and the second intersection are located in a range of 5 mm to 50 mm from the second plane toward the first side in the second direction.

4. The light guide device according to claim 1, wherein the plurality of partial reflection planes include aligned partial reflection planes that are aligned such that the corresponding pitches of the aligned partial reflection planes sequentially become wider toward the side of the second end portion in the first direction from the side of the first end portion.

5. The light guide device according to claim 1, wherein the plurality of partial reflection planes include aligned partial reflection planes that are aligned such that the pitch of each partial reflection plane of the aligned partial reflection planes becomes wider toward the side of the second end portion in the first direction from the side of the first end portion.

6. The light guide device according to claim 1, wherein at least one partial reflection plane of the plurality of partial reflection planes includes a multilayer film containing a reflective metal layer.

7. The light guide device according to claim 1, wherein the plurality of partial reflection planes vary in reflectance depending on an incident angle.

8. A display device comprising:
the light guide device according to claim 1; and
an image generation system configured to generate an image.

9. A display device comprising:
the light guide device according to claim 2; and
an image generation system configured to generate an image.

10. A display device comprising:
the light guide device according to claim 3; and
an image generation system configured to generate an image.

11. A display device comprising:
the light guide device according to claim 4; and
an image generation system configured to generate an image.

12. A display device comprising:
the light guide device according to claim 5; and
an image generation system configured to generate an image.

13. A display device comprising:
the light guide device according to claim 6; and
an image generation system configured to generate an image.

14. A display device comprising:
the light guide device according to claim 7; and
an image generation system configured to generate an image.

15. A display device comprising:
the light guide device according to claim 1; and
an image generation system configured generate an image, wherein:

a first partial reflection plane end portion of each partial reflection plane of the plurality of partial reflection planes is on a side of the second end portion in the second direction, a second partial reflection plane end portion of each partial reflection plane of the plurality of partial reflection planes is on a side of the first end portion in the second direction, an imaginary straight line is drawn so as to pass the second partial reflection plane end portion of a first partial reflection plane of two adjacent partial reflection planes located on the side of the first end portion, and the first partial reflection plane end portion of a second partial reflection plane of the two adjacent partial reflection planes located on the side of the second end portion, and the light guide device is configured to satisfy a conditional expression of:

$$(P0-P0/2) \le P \le (P0+P0/2),$$

where P0 represents an ideal pitch in a case where the plurality of partial reflection planes are located such that the imaginary straight line passes a pupil of a viewer and the transparent light guide section is located in front of an eye of the viewer, and P represents an actual pitch of the plurality of partial reflection planes provided in the transparent light guide section.

16. The display device according to claim 8, wherein:
the light guide device includes a transparent input section connected to the first end portion of the transparent light guide section,
the transparent input section includes (i) a curved input surface configured to receive the image light inputted as non-parallel light, and (ii) a curved reflecting surface configured to reflect the image light inputted through the curved input surface, and the curved input surface and the curved reflecting surface are configured to convert the image light into parallel light and output the parallel light to the transparent light guide section.

17. The display device according to claim 16, wherein:
the input section is formed in a first transparent member,
the first transparent member is surface-joined to a second transparent member in the first direction and via a joint interface, and
the plurality of partial reflection planes of the transparent light guide section are formed on the second transparent member.

18. The display device according to claim 17, wherein the joint interface is formed such that a first joint edge, which corresponds to an end portion on the second side in the second direction, is disposed on the side of the first end portion with respect to a second joint edge corresponding to an end portion on the first side in the second direction.

19. The display device according to claim 15, wherein the ideal pitch P0 is in a range of 0.9 mm to 2.0 mm.

* * * * *